(12) United States Patent  (10) Patent No.: US 8,674,902 B2
Park et al.  (45) Date of Patent: Mar. 18, 2014

(54) METHOD FOR GENERATING SIGNAL TO DISPLAY THREE-DIMENSIONAL (3D) IMAGE AND IMAGE DISPLAY APPARATUS USING THE SAME

(75) Inventors: Jung-jin Park, Suwon-si (KR); Rustam Abdulaev, Suwon-si (KR); Tae-hyeun Ha, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 671 days.

(21) Appl. No.: 12/206,328

(22) Filed: Sep. 8, 2008

(65) Prior Publication Data

US 2009/0237327 A1    Sep. 24, 2009

(30) Foreign Application Priority Data

Mar. 24, 2008 (KR) .......................... 10-2008-0026879

(51) Int. Cl.
  *G09G 5/00* (2006.01)
(52) U.S. Cl.
  USPC ........ 345/8; 348/53; 348/54; 348/55; 348/56; 359/462; 359/464
(58) Field of Classification Search
  USPC .................. 345/7–9; 348/51–60, 616–617; 359/462, 464; 381/71.6, 74; 327/40–41, 165, 18; 341/15
  See application file for complete search history.

(56) References Cited

U.S. PATENT DOCUMENTS

| | | | | |
|---|---|---|---|---|
| 4,737,723 | A | * | 4/1988 | Mita ................................ 327/20 |
| 4,967,268 | A | * | 10/1990 | Lipton et al. ..................... 348/56 |
| 5,642,069 | A | * | 6/1997 | Waite .............................. 327/292 |
| 5,781,025 | A | * | 7/1998 | Sachdev et al. ................. 326/16 |
| 5,892,505 | A | * | 4/1999 | Tropper .......................... 345/208 |
| 6,456,432 | B1 | * | 9/2002 | Lazzaro et al. ................ 359/464 |
| 6,496,533 | B2 | * | 12/2002 | Lennen .......................... 375/147 |
| 6,678,091 | B2 | * | 1/2004 | Tropper .......................... 359/462 |
| 6,891,401 | B2 | * | 5/2005 | Starr et al. ........................ 327/18 |
| 7,046,048 | B2 | | 5/2006 | Starr et al. |
| 7,454,645 | B2 | * | 11/2008 | Li et al. .......................... 713/500 |

(Continued)

FOREIGN PATENT DOCUMENTS

| | | |
|---|---|---|
| CN | 1571957 A | 1/2005 |
| CN | 1901759 A | 1/2007 |
| KR | 200366330 Y1 | 11/2004 |

OTHER PUBLICATIONS

Application Note: AN886, "Selecting the Right Comparator," Dec. 13, 2001, Maxim, Inc., www.maxim-ic.com, pp. 1, 6.*

(Continued)

*Primary Examiner* — Alexander Eisen
*Assistant Examiner* — Sanjiv D Patel
(74) *Attorney, Agent, or Firm* — Sughrue Mion, PLLC

(57) ABSTRACT

A method for generating a signal to display a three-dimensional (3D) image, and an image display apparatus using the same are disclosed. The method includes receiving a first synchronization signal, generating a second synchronization signal, and generating an output signal. Therefore, a user may satisfactorily view a 3D image regardless of whether the synchronization signal received from a display device reports errors or whether there is an obstruction between the display device and shutter glasses.

40 Claims, 4 Drawing Sheets

(56) References Cited

U.S. PATENT DOCUMENTS

| | | |
|---|---|---|
| 7,831,056 B2 | 11/2010 | Nikles et al. |
| 2001/0043266 A1 | 11/2001 | Robinson et al. |
| 2002/0118277 A1* | 8/2002 | Divelbiss et al. ............... 348/56 |
| 2005/0012525 A1 | 1/2005 | Starr et al. |
| 2005/0025495 A1* | 2/2005 | Devine et al. ................. 398/140 |
| 2005/0163201 A1* | 7/2005 | Krasner ........................ 375/150 |
| 2006/0197558 A1 | 9/2006 | Starr et al. |
| 2007/0025573 A1 | 2/2007 | Nikles et al. |
| 2007/0069918 A1* | 3/2007 | You .......................... 340/825.69 |

OTHER PUBLICATIONS

Communication dated May 30, 2012 issued by the State Intellectual Property Office of P.R. China in counterpart Chinese Patent Application No. 200810149830.5.

Communication dated Jun. 15, 2012 issued by the Korean Intellectual property Office in counterpart Korean Patent Application No. 10-2008-0026879.

Communication dated Aug. 20, 2013, issued by the State Intellectual Property Office of P.R.C. in counterpart Chinese Application No. 200810149830.5.

* cited by examiner

# METHOD FOR GENERATING SIGNAL TO DISPLAY THREE-DIMENSIONAL (3D) IMAGE AND IMAGE DISPLAY APPARATUS USING THE SAME

CROSS-REFERENCE TO RELATED APPLICATIONS

This application claims priority under 35 U.S.C. §119 from Korean Patent Application No. 10-2008-0026879, filed on Mar. 24, 2008, in the Korean Intellectual Property Office, the disclosure of which is incorporated herein by reference in its entirety.

BACKGROUND OF THE INVENTION

1. Field of the Invention

Apparatuses and methods consistent with the present invention relate to a method for generating a signal and an image display apparatus using the same, and more particularly, to a method for generating a signal to display a three-dimensional (3D) image, and an image display apparatus using the same.

2. Description of the Related Art

Three dimensional (3D) image display technology is applied in a wide variety of fields, including communications, broadcasting, medical services, education, the military, computer games, computer animation, virtual reality, computer-aided design (CAD), industrial technology, or the like, and is at the core of current development for the next generation of information communication, for which there is currently a highly competitive development environment.

A person perceives a 3D effect due to various reasons, including variations in the thickness of the lenses of his or her eyes, the angle between his or her eyes and the subject, the position of the subject as viewed through both eyes, the parallax caused by the motion of the subject, and psychological effects.

Binocular disparity, which refers to the difference between the images of an object as seen by the left and right eyes due to the horizontal separation of the eyes by about 6 to 7 cm, is the most important factor in producing a three-dimensional feeling. The left and right eyes see different two dimensional images which are transmitted to the brain through the retina. The brain then fuses these two different images with great accuracy to reproduce the sense of a three-dimensional image.

3D image display apparatuses may be divided into glass type and non-glass type apparatuses. Glass type apparatuses include a color filter type apparatus which filters an image using a color filter including complementary color filter segments, a polarizing filter type apparatus which divides an image into a left eye image and a right eye image using a shading effect caused by a polarized light element, the directions of which are orthogonal to each other, and a shutter glass type apparatus which blocks a left eye and right eye alternately to correspond to a synchronization signal.

Shutter glass type apparatuses use different perspectives for each eye, which provides an image on the display device while turning each eye on or off, so that the user perceives a sense of space from an image viewed at different angles.

However, not only must a user wear shutter glasses, but also the display device is synchronized wirelessly with the shutter glasses in order to display a 3D image. If the display device temporarily fails to be synchronized with the shutter glasses, it is impossible for the user to view a 3D image.

SUMMARY OF THE INVENTION

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

The present invention provides a method for generating a signal to display a 3D image, in which a user can view a 3D image even if a display apparatus fails to be synchronized with an image display apparatus, and the image display apparatus.

According to an exemplary aspect of the present invention, there is provided a method for generating a signal to display an image, including receiving a first synchronization signal which is synchronized with a signal of a left eye image and a right eye image; generating a second synchronization signal by repeating part of the first synchronization signal; and generating an output signal by combining the first synchronization signal with the second synchronization signal.

The step of generating the output signal may include if the first synchronization signal indicates a first level, generating the first synchronization signal as the output signal; and if the first synchronization signal indicates a second level, generating the second synchronization signal as the output signal.

The method may further include receiving, by a left eye glass and a right eye glass, the signal of the left eye image and the right eye image.

The step of receiving may include if the output signal indicates the first level, opening one of the left eye glass and the right eye glass, and receiving the signal of the left eye image if opening the left eye glass or receiving the signal of the right eye image if opening the right eye glass; and if the output signal indicates the second level, opening the other of the left eye glass and the right eye glass, and receiving the signal of the left eye image if opening the left eye glass or receiving the signal of the right eye image if opening the right eye glass.

The first level may be one of a high level and a low level, and the second level may be the other of the high level and the low level.

The repeated part of the first synchronization signal may be directly proportional to a cycle of the first synchronization signal.

The first synchronization signal may be an infrared (IR) signal.

The output signal may be synchronized with the image signal.

According to another exemplary aspect of the present invention, there is provided a method for generating a signal to display an image, including receiving a first synchronization signal which is synchronized with a signal of a left eye image and a right eye image; generating a second synchronization signal by repeating part of the first synchronization signal; and controlling inputting alternately a signal of the left eye image and a signal of the right eye image using the second synchronization signal.

The method may further include receiving the signal of the left eye image through a left eye glass; and receiving the signal of the right eye image through a right eye glass.

According to an exemplary aspect of the present invention, there is provided an image display apparatus, including a receiver which receives a first synchronization signal synchronized with a signal of a left eye image and a right eye image; and a control unit which generates a second synchronization signal by repeating part of the first synchronization signal, and generates an output signal by combining the first synchronization signal with the second synchronization signal.

If the first synchronization signal indicates a first level, the control unit may generate the first synchronization signal as the output signal; and if the first synchronization signal indicates a second level, the control unit may generate the second synchronization signal as the output signal.

The apparatus may further include a left eye glass unit which is implemented to display the left eye image; and a right eye glass unit which is implemented to display the right eye image.

If the output signal indicates the first level, the control unit may open one of the left eye glass unit and the right eye glass unit; and if the output signal indicates the second level, the control unit may open the other of the left eye glass unit and the right eye glass unit.

The first level may be one of a high level and a low level, and the second level may be the other of the high level and the low level.

The repeated part of the first synchronization signal may be directly proportional to a cycle of the first synchronization signal.

The first synchronization signal may be an infrared (IR) signal.

The output signal may be synchronized with the image signal.

According to another exemplary aspect of the present invention, there is provided an image display apparatus, including a receiver which receives a first synchronization signal synchronized with a signal of a left eye image and a right eye image; and a control unit which generates a second synchronization signal by repeating part of the first synchronization signal, and generates an output signal by combining the first synchronization signal with the second synchronization signal.

The control unit may control to input the left eye image into a left eye glass unit, and to input the right eye image into a right eye glass unit.

According to another exemplary aspect of the present invention, there is provided an image system, including a display device which transmits a synchronization signal synchronized with a signal of a left eye image and a right eye image which are alternately displayed; and shutter glasses which generate a reference signal by repeating part of the synchronization signal transmitted from the display device, and generate an output signal by combining the synchronization signal with the reference signal.

According to another exemplary aspect of the present invention, there is provided an image system, including a display device which transmits a synchronization signal synchronized with a signal of a left eye image and a right eye image which are alternately displayed; and shutter glasses which generate a reference signal by repeating part of the synchronization signal transmitted from the display device, and alternately open a left eye glass unit and a right eye glass unit in order to input the left eye image signal and the right eye image signal alternately using the reference signal.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF EXEMPLARY EMBODIMENTS OF THE INVENTION

Figure 1:
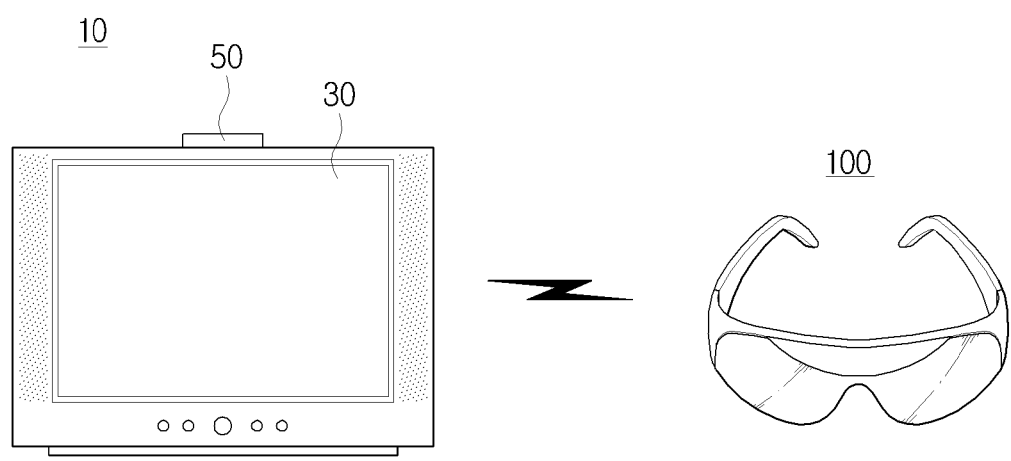
FIG. 1 is a view of a three-dimensional (3D) image system to receive a 3D image according to an exemplary embodiment of the present invention.

Certain exemplary embodiments of the present invention will now be described in greater detail with reference to the accompanying drawings.

In the following description, the same drawing reference numerals are used for the same elements even in different drawings. The matters defined in the description, such as detailed construction and elements, are provided to assist in a comprehensive understanding of the invention. Thus, it is apparent that the present invention can be carried out without those specifically defined matters. Also, well-known functions or constructions are not described in detail since they would obscure the invention with unnecessary detail.

FIG. 1 is a view of a three-dimensional (3D) image system to receive a 3D image according to an exemplary embodiment of the present invention. Referring to FIG. 1, the 3D image system comprises a display device 10 and shutter glasses 100 to display a 3D image.

The display device 10 generates a left eye image and a right eye image, and provides a user alternately with the generated images. The user receives the two images alternately from the display device 10, and thereby views a 3D image. The display device 10 comprises a display 30 and infrared (IR) transmitter 50.

The display device 10 generates a left eye image and a right eye image, and outputs the left and right images through the display 30 in an alternate order at regular time intervals.

The display device 10 generates a synchronization signal which is synchronized with the signal of the left eye image and the right eye image, and transmits the synchronization signal to the IR transmitter 50.

The display device 10 transmits the synchronization signal to the shutter glasses 100 through the IR transmitter 50 by means of IR transmission.

The shutter glasses 100 receive the synchronization signal from the display device 10, synchronize the synchronization signal with the signal of the left eye image and the right eye image, and alternately open a left eye glass and a right eye glass.

Hereinbelow, the shutter glasses 100 will be explained in detail with reference to FIG. 2.

Figure 2:
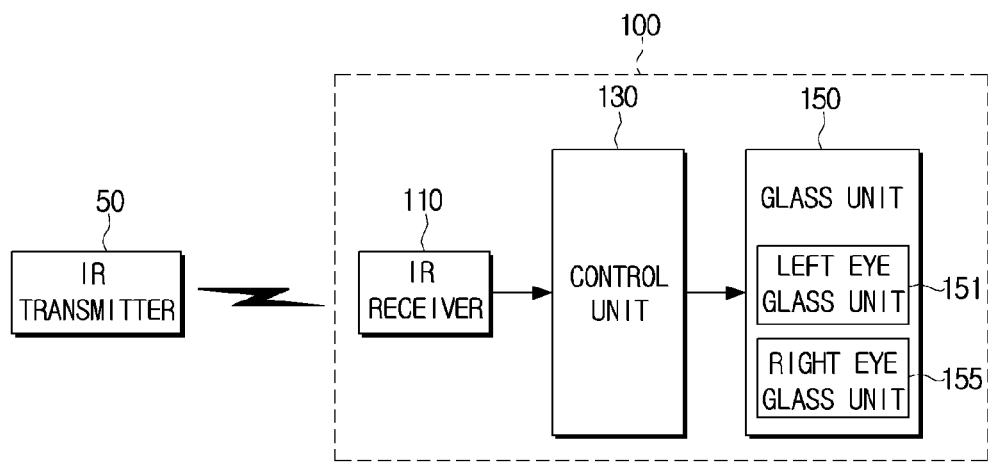
FIG. 2 is a block diagram illustrating glasses applicable to an exemplary embodiment of the present invention.

FIG. 2 is a block diagram illustrating glasses applicable to an exemplary embodiment of the present invention. In FIG. 2, the IR transmitter 50 of the display device 10 is also illustrated for convenience of description. The shutter glasses 100 comprise an IR receiver 110, a control unit 130, and a glass unit 150.

The IR receiver 110 receives a synchronization signal of a 3D image from the IR transmitter 50 which is wirelessly connected to the IR receiver 110. The IR transmitter 50 transmits the synchronization signal using infrared rays emitted in straight lines, and the IR receiver 110 receives the synchronization signal from the emitted infrared rays.

As the infrared rays are emitted in straight lines, there should be no obstruction between the IR transmitter 50 and the IR receiver 110, so the IR receiver 100 can securely receive the synchronization signal. If there is an obstruction between the IR transmitter 50 and the IR receiver 110, the IR receiver 110 cannot securely receive the synchronization signal from the IR transmitter 50.

For example, the IR transmitter 50 transmits a square wave synchronization signal having repeated high and low levels and a cycle of 0.1 sec. In this situation, if there is no obstruction between the IR transmitter 50 and the IR receiver 110, the IR receiver 110 securely receives the square wave synchronization signal from the IR transmitter 50.

However, if there is an obstruction between the IR transmitter 50 and the IR receiver 110, the IR receiver 110 may not securely receive the square wave synchronization signal transmitted from the IR transmitter 50, but instead may receive a synchronization signal having either a high level or low level during the time period in which the obstruction interferes with transmission of the signal.

In this exemplary embodiment of the present invention, the low level synchronization signal is received when obstruction blocks the signal transmission.

The IR receiver 110 transmits the synchronization signal received from the IR transmitter 50 to the control unit 130.

The control unit 130 controls overall operations of the shutter glasses 100. Specifically, the control unit 130 generates a reference signal using an original signal received from the IR receiver 110, and generates an output signal using the generated reference signal.

The original signal and the reference signal will be explained below, and also the operation in which the control unit 130 generates an output signal using the original signal and the reference signal will be explained in detail with reference to FIG. 3.

Figure 3:
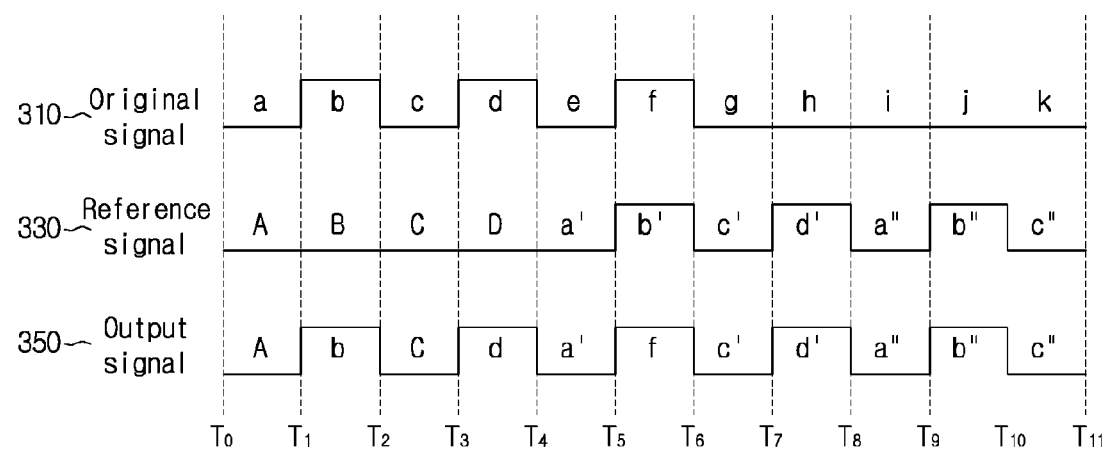
FIG. 3 is a diagram provided to explain an original signal, a reference signal, and an output signal.

FIG. 3 is a diagram provided to explain an original signal, a reference signal, and an output signal.

An original signal 310 represents a signal which is transmitted from the IR transmitter 50 to the IR receiver 110 as described above.

Referring to FIG. 3, the original signal 310 alternates between a low level and a high level from T0 to T6 at a regular interval, and remains at a low level after T6.

As the IR transmitter 50 transmits a signal which is synchronized with a display signal of a 3D image, and alternates periodically between a high level and a low level in order to display the 3D image, the original signal 310 received from the IR receiver 110 is blocked by an obstruction between T6 and T11. Specifically, the obstruction causes the original signal 310 to remain at a low level between T6 and T11.

A reference signal 330 represents a signal which a control unit 130 generates using part of the original signal 310. The control unit 130 uses part (bands a, b, c, and d) of the original signal 310 to generate the reference signal 330. Specifically, the control unit 130 generates bands a', b', c', d', a", b", c", . . . of the reference signal 330 by repeating bands a, b, c, and d of the original signal 310.

The two cycles of the original signal 310, that is bands a, b, c, and d, are repeated to generate the reference signal 330, but this is merely exemplary. Alternatively, one cycle of the original signal 310, that is bands a and b, or three cycles, that is bands a, b, c, d, e, and f may be repeated to generate the reference signal 330.

The reference signal 330 should be synchronized with the signal of a left eye image and a right eye image, which is a display signal of a 3D image used in order to view a normal 3D image. To synchronize the reference signal 330 with the signal of the left eye image and the right eye image, the reference signal 330 is generated by repeating one cycle of the original signal 310 a whole number of times.

The control unit 130 receives the original signal 310, and then generates the reference signal 330. Accordingly, the reference signal 330 is not generated in the period between T0 and T4, and remains at a low level at bands A, B, C, and D.

The control unit 130 combines the original signal 310 with the reference signal 330 to generate an output signal 350. The output signal 350 has a regular cycle so as to be synchronized with the signal of the left eye image and the right eye image. Therefore, the output signal 350 is generated by combining the original signal 310 and the reference signal 330 by complementing a non-periodic part of the signals 310 and 330.

More specifically, when the original signal 310 indicates a high level, the control unit 130 employs the original signal 310, and when the original signal 310 indicates a low level, the control unit 130 employs the reference signal 330. The output signal 350 is generated by combining the employed signals.

When the original signal 310 indicates a high level, the obstruction does not disturb the signal transmitted by the IR transmitter 50. Accordingly, the control unit 130 employs the original signal 310 to generate the output signal 350. Specifically, the control unit 130 adopts part of the original signal 310 corresponding to band b between T1 and T2, band d between T3 and T4, and band f between T5 and T6 to generate the output signal 350.

On the other hand, when the original signal 310 indicates a low level, the obstruction may disturb the signal transmitted by the IR transmitter 50. Accordingly, the control unit 130 employs the reference signal 330 instead of the original signal 310 to generate the output signal 350. Namely, the control unit 130 adopts part of the original signal 310 corresponding to band A between T0 and T1, band C between T2 and T3, band a' between T4 and T5, and bands c', d', a", b" and c" between T6 and T11.

Alternatively, the control unit 130 may use only the reference signal 330 without combining the original signal 310 with the reference signal 330 to generate the output signal 350.

As described above, the output signal 350 must have a regular cycle so as to be synchronized with the signal of the left eye image and the right eye image.

The control unit 130 employs part of the original signal 310 first of all, and generates the output signal 350 by repeating one cycle of the employed original signal 310. Since the original signal 310 is synchronized with the signal of the left eye image and the right eye image, the output signal 350 generated by repeating one cycle of the original signal 310 may also be synchronized with the signal of the left eye image and the right eye image.

Even when the output signal 350 is generated by using only the original signal 310, one cycle of the original signal 310 is used to generate the reference signal 330, and thus the reference signal 330 is used as the output signal 350. Accordingly, the output signal 350 is the same as the output signal generated by combining the original signal 310 with the reference signal 330.

In other words, generating the output signal 350 using only the reference signal 330 means generating the output signal 350 using the reference signal 330 generated from the original signal 310.

More specifically, as the output signal 350 is generated using the reference signal 330 generated from the original signal 310, the original signal 310 seems as if it is not used to generate the output signal 350.

The control unit 130 generates the output signal 350 by employing part of the original signal 310 and the reference signal 330. The output signal 350 repeats itself in a regular cycle, and is completely synchronized with the signal of the left eye image and the right eye image, which is a display signal of a 3D image.

The control unit 130 transmits the generated output signal to the glass unit 150.

The glass unit 150 opens or closes shutters according to the output signal 350 transmitted from the control unit 130, and causes the cycle of the output signal 350 to be synchronized with the cycle of the signal of the 3D image displayed on the display device 10.

The glass unit 150 comprises a left eye glass unit 151 and a right eye glass unit 155. The left eye glass unit 151 is implemented to view a left eye image. When the signal transmitted from the IR transmitter 50 has a low level, and the display device 10 displays a left eye image, the control unit 130 opens the left eye glass unit 151 so as to input the left eye image to the left eye of a user through the left eye glass unit 151, and closes the right eye glass unit 155 so that the left eye image is not input to the right eye of the user.

When the signal transmitted from the IR transmitter 50 has a high level as described above, and the display device 10 displays a right eye image, the control unit 130 opens the right eye glass unit 155 so as to input the right eye image to the right eye of a user through the right eye glass unit 155, and closes the left eye glass unit 151 so that the right eye image is not input to the left eye of the user.

Therefore, the user may view the left eye image corresponding to bands A, C, a', c', a", and c" having a low level, and view the right eye image corresponding to bands b, d, f, d', and b" having a high level. In doing so, the user may view a 3D image by viewing left and right images which are viewed from the different angles of his or her left and right eyes respectively.

Figure 4:
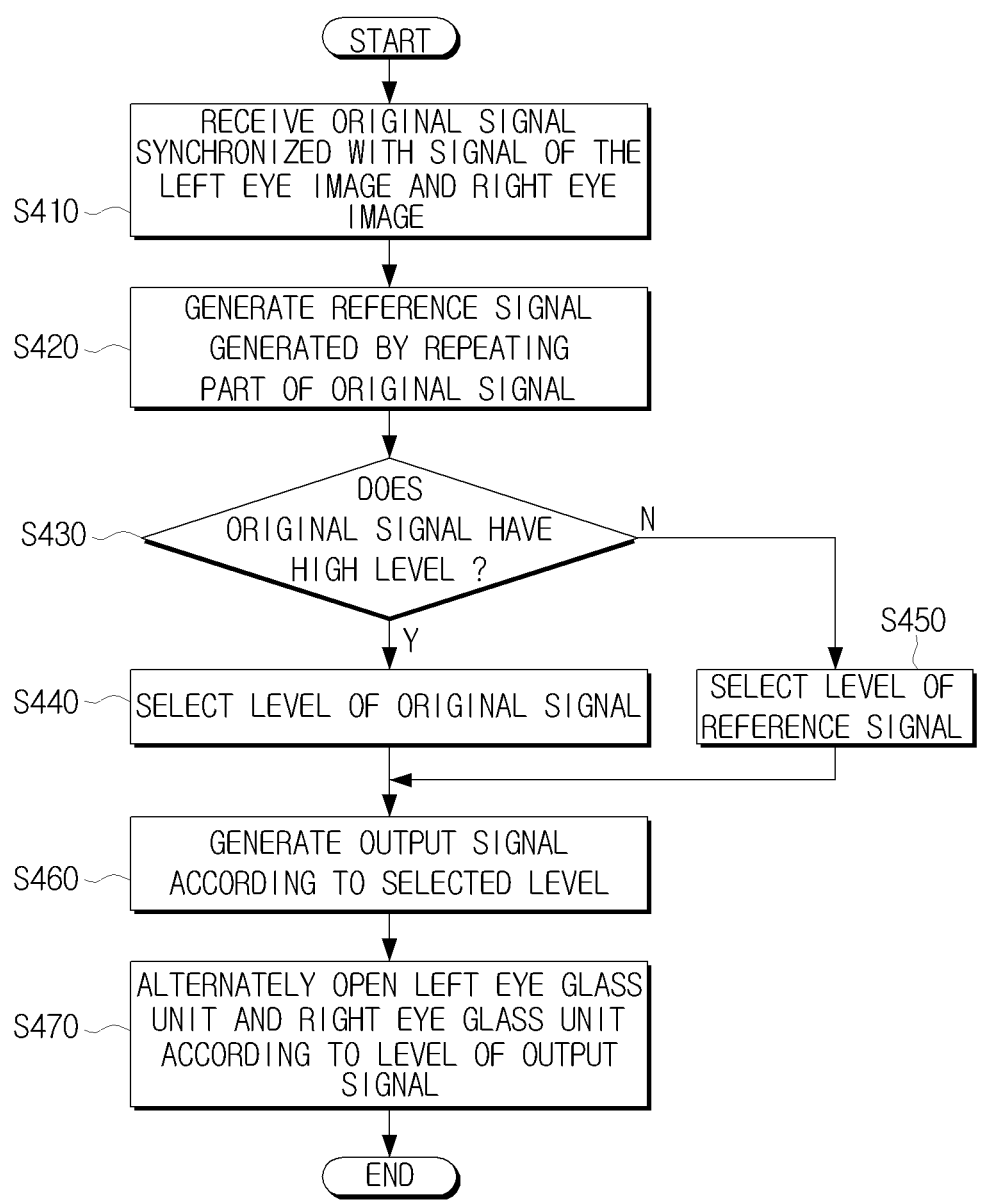
FIG. 4 is a flowchart provided to explain a method for receiving a signal to view a 3D image according to an exemplary embodiment of the present invention.

FIG. 4 is a flowchart provided to explain a method for receiving a signal to view a 3D image according to an exemplary embodiment of the present invention.

The IR receiver 110 of the shutter glasses 100 receives the original signal 310 which is synchronized with the signal of the left eye image and the right eye image from the IR transmitter 50 of the display device 10 (S410).

The IR receiver 110 transmits the received original signal 310 to the control unit 130, and the control unit 130 generates the reference signal 330 which is generated by repeating part of the original signal 310 (S420).

The control unit 130 determines whether the original signal 310 has a high level or a low level in order to combine the original signal 310 with the reference signal 330 (S430).

If the original signal 310 indicates a high level (S430-Y), the control unit 130 selects the original signal 310 having the high level (S440), and if the original signal 310 indicates a low level (S430-N), the control unit 130 selects the reference signal 330 (S450).

The control unit 130 generates the output signal 350 by combining the selected signals (S460).

The control unit 130 controls the glass unit 150 so as to alternately open or close the left eye glass unit 151 and the right eye glass unit 155 according to the level of the generated output signal 350 (S470).

Figure 5:
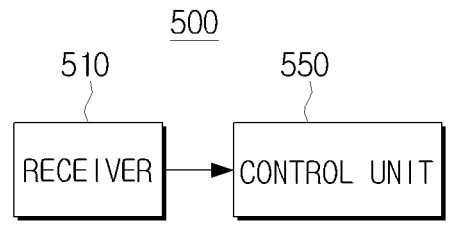
FIG. 5 is a block diagram illustrating shutter glasses according to an exemplary embodiment of the present invention.

FIG. 5 is a block diagram illustrating shutter glasses according to an exemplary embodiment of the present invention.

Shutter glasses 500 receive a synchronization signal from a display device wirelessly connected thereto, and alternately opens a left eye glass and a right eye glass. The shutter glasses 500 comprise a receiver 510 and a control unit 550.

The receiver 510 receives the first synchronization signal which is synchronized with a signal of a left eye image and a right eye image.

The control unit 550 generates the second synchronization signal by repeating part of the first synchronization signal, and generates an output signal by combining the first and second synchronization signals.

Figure 6:
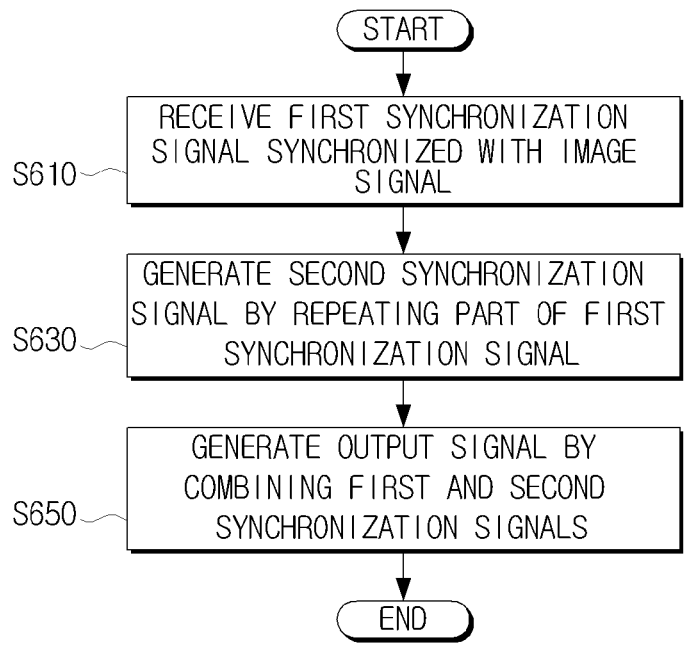
FIG. 6 is a flowchart provided to explain a method for generating a signal to view an image according to an exemplary embodiment of the present invention.

FIG. 6 is a flowchart provided to explain a method for generating a signal to display an image according to an exemplary embodiment of the present invention.

The receiver 510 receives the first synchronization signal which is synchronized with the signal of the left eye image and the right eye image (S610).

The control unit 550 generates the second synchronization signal by repeating part of the first synchronization signal (S630).

The control unit 550 generates the output signal by combining the first and second synchronization signals (S650).

Figure 7:
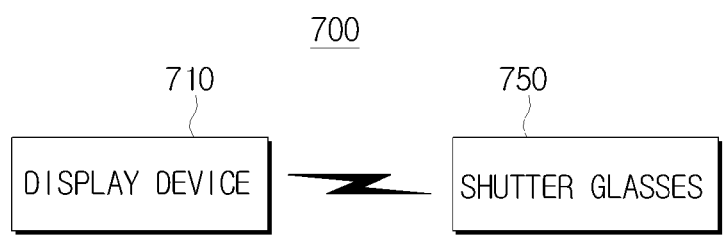
FIG. 7 is a block diagram illustrating an image system according to an exemplary embodiment of the present invention.

FIG. 7 is a block diagram illustrating an image system according to an exemplary embodiment of the present invention.

A display device 710 transmits a synchronization signal synchronized with an output signal of a left eye image and a right eye image which are displayed alternately.

Shutter glasses 750 generate the reference signal 330 by repeating part of the synchronization signal transmitted from a transmitter, and generate an output signal by combining the synchronization signal with the reference signal 330.

In this exemplary embodiment of the present invention, the display device is wirelessly connected to the shutter glasses to receive the original signal 310, but this is merely exemplary. The present invention may also be applied when the display device is wiredly connected to the shutter glasses. Even if a cable connecting the display device to the shutter glasses is out of order, or the original signal is abnormally received, the shutter glasses may generate the reference signal 330 by using a normally received part of the original signal 310, and generate the output signal using the reference signal 330.

The original signal 310 according to an exemplary embodiment of the present invention is an IR signal, and the IR signal is not received completely when there is an obstruction between the display device and the shutter glasses. However, this is merely an exemplary embodiment of the present invention. Therefore, even when the original signal 310 is not an IR signal, the original signal 310 may not be received securely due to interference with the other signals. In this case, the shutter glasses may generate the output signal 350 using a securely received part of the original signal 310.

According to an exemplary embodiment of the present invention, the control unit 130 employs the original signal 310 when the original signal indicates a high level, and employs the reference signal 330 when the original signal indicates a low level, when generating the output signal 350 by combining the original signal 310 with the reference signal 330. However, this is merely an exemplary embodiment of the present invention for convenience of description.

An exemplary embodiment of the present invention may be implemented using an OR gate in order to generate the output signal 350 by combining logical values of the original signal 310 and reference signal 330. An exemplary embodiment of the present invention may also be implemented to generate the output signal 350 by employing the original signal 310 during two periods, and employing the reference signal 330 after employing two periods of the original signal 310.

When the output signal represents a high level, a right eye image is displayed, and a right eye glass unit is opened, but this is merely exemplary. Alternatively, the right eye image may be displayed, and the right eye glass unit may be opened when the output signal represents a low level.

While the reference signal 330 is a low level during two cycles of the original signal 310, this is merely an exemplary embodiment of the present invention for convenience of description. The reference signal 330 may be generated in other manners as long as the original signal 310 corresponds to the period of the reference signal 330.

As described above, according to an exemplary embodiment of the present invention, the user may satisfactorily view a 3D image regardless of whether the synchronization signal received from the display device reports errors or whether there is an obstruction between the display device and the shutter glasses.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A method for generating a signal to display an image, comprising:
    receiving, at a glasses unit, an external synchronization signal which is synchronized with an external display of a left eye image and a right eye image;
    generating, in the glasses unit, an internal synchronization signal based on a periodic portion of the external synchronization signal; and
    generating an output signal based on the external synchronization signal and the internal synchronization signal,
    wherein the generating the output signal comprises:
        if the external synchronization signal comprises a signal which periodically alternates between a first level and a second level, the output signal corresponds to the external synchronization signal; and
        if the external synchronization signal comprises a signal which does not periodically alternate between the first level and the second level, the output signal corresponds to the internal synchronization signal.

2. The method of claim 1, wherein the left eye image is incident on a left eye glass of the glasses unit and the right eye image is incident on a right eye glass of the glasses unit.

3. The method of claim 2, further comprising:
    if the output signal indicates a first level, opening one of a shutter of the left eye glass and a shutter of the right eye glass; and
    if the output signal indicates a second level, opening the other of the shutter of the left eye glass and the shutter of the right eye glass.

4. The method of claim 1, wherein the first level is one of a high level and a low level, and the second level is the other of the high level and the low level.

5. The method of claim 1, wherein the generating the internal synchronization signal comprises repeating the periodic portion of the external synchronization signal, wherein a length of the periodic portion of the external signal is directly proportional to a cycle of the external synchronization signal.

6. The method of claim 1, wherein the external synchronization signal is an infrared signal.

7. The method of claim 1, wherein the output signal is synchronized with the external display of the left eye image and the right eye image.

8. A method for generating a signal to display an image, comprising:
    receiving, at a glasses unit, an external synchronization signal which is synchronized with an external display of a left eye image and a right eye image;
    generating, in the glasses unit, an internal synchronization signal based on a periodic portion of the external synchronization signal;
    generating an output signal based on the external synchronization signal and the internal synchronization signal and
    alternately controlling a left eye glass unit of the glasses unit and a right eye glass unit of the glasses unit using the output signal,
    wherein the external synchronization signal as a whole is non-periodic, and
    wherein the generating the output signal comprises:
        if the external synchronization signal comprises a signal which periodically alternates between a first level and a second level, the output signal corresponds to the external synchronization signal; and
        if the external synchronization signal comprises a signal which does not periodically alternate between the first level and the second level, the output signal corresponds to the internal synchronization signal.

9. The method of claim 8, wherein the left eye image is incident on the left eye glass and the right eye image is incident on the right eye glass.

10. An image display apparatus, comprising:
    a receiver which receives an external synchronization signal which is synchronized with an external display of a left eye image and a right eye image; and
    a control unit which generates an internal synchronization signal based on a periodic portion of the external synchronization signal, and generates an output signal based on the external synchronization signal and the internal synchronization signal;
    wherein if the external synchronization signal comprises a signal which periodically alternates between a first level and a second level, the output signal corresponds to the external synchronization signal; and if the external synchronization signal comprises a signal which does not periodically alternate between the first level and the second level, the output signal corresponds to the internal synchronization signal.

11. The apparatus of claim 10, further comprising:
    a left eye glass unit which transmits the left eye image; and
    a right eye glass unit which transmits the right eye image.

12. The apparatus of claim 11, wherein if the output signal indicates a first level, the control unit opens one of a shutter of the left eye glass unit and a shutter of the right eye glass unit; and if the output signal indicates a second level, the control unit opens the other of the shutter of the left eye glass unit and the shutter of the right eye glass unit.

13. The apparatus of claim 10, wherein the first level is one of a high level and a low level, and the second level is the other of the high level and the low level.

14. The apparatus of claim 10, wherein the control unit generates the internal synchronization signal by repeating the periodic portion of the external synchronization signal, wherein the periodic portion of the external synchronization signal is directly proportional to a cycle of the external synchronization signal.

15. The apparatus of claim 10, wherein the external synchronization signal is an infrared signal.

16. The apparatus of claim 10, wherein the output signal is synchronized with the external display of the left eye image and the right eye image.

17. An image display apparatus, comprising:
a receiver which receives an external synchronization signal synchronized with an external display of a left eye image and a right eye image; and
a control unit which generates an internal synchronization signal based on a periodic portion of the external synchronization signal, generates an output signal based on the external synchronization signal and the internal synchronization signal, and alternately controls a left eye glass unit and a right eye glass unit using the output signal,
wherein the external synchronization signal as a whole is non-periodic; and
wherein if the external synchronization signal comprises a signal which periodically alternates between a first level and a second level, the output signal corresponds to the external synchronization signal; and if the external synchronization signal comprises a signal which does not periodically alternate between the first level and the second level, the output signal corresponds to the internal synchronization signal.

18. The apparatus of claim 17, wherein the control unit controls the left eye glass unit to transmit the left eye image, and controls right eye glass unit to transmit the right eye image.

19. An image system, comprising:
a display device which transmits a display synchronization signal which is synchronized with a display of a left eye image and a right eye image; and
shutter glasses which receive the display synchronization signal and generate a reference synchronization signal based on a periodic portion of the display synchronization signal, and generate an output signal based on the display synchronization signal and the reference synchronization signal;
wherein if the external synchronization signal comprises a signal which periodically alternates between a first level and a second level, the output signal corresponds to the external synchronization signal; and if the external synchronization signal comprises a signal which does not periodically alternate between the first level and the second level, the output signal corresponds to the reference synchronization signal.

20. An image system, comprising:
a display device which transmits a display synchronization signal synchronized with a display of a left eye image and a right eye image; and
shutter glasses which receive the display synchronization signal and generate a reference synchronization signal based on a periodic portion of the display synchronization signal, generate an output signal based on the display synchronization signal and the reference synchronization signal and use the output signal to alternately open a shutter of a left eye glass unit and a shutter of a right eye glass unit in order to transmit the left eye image and the right eye image,
wherein the display synchronization signal as a whole is non-periodic, and
wherein if the display synchronization signal comprises a signal which periodically alternates between a first level and a second level, the output signal corresponds to the display synchronization signal; and if the display synchronization signal comprises a signal which does not periodically alternate between the first level and the second level, the output signal corresponds to the reference synchronization signal.

21. A method for generating a signal to display an image using shutter glasses, the method comprising:
receiving, in the shutter glasses, an external synchronization signal which is synchronized with an external display of a left eye image and a right eye image;
generating, in the shutter glasses, an internal synchronization signal based on a periodic portion of the external synchronization signal; and
generating an output signal based on the internal synchronization signal,
wherein the generating the output signal comprises:
if the external synchronization signal comprises a signal which periodically alternates between a first level and a second level, the output signal corresponds to the external synchronization signal; and
if the external synchronization signal comprises a signal which does not periodically alternate between the first level and the second level due to having been interrupted, the output signal corresponds to the internal synchronization signal.

22. The method of claim 21, wherein the shutter glasses comprise a left eye glass and a right eye glass, and the method further comprises: alternately opening a shutter of the left eye glass and a shutter of the right eye glass according to the generated output signal.

23. A shutter glass apparatus comprising:
a left eye unit operable to transmit a left eye image incident thereon;
a right eye unit operable to transmit a right eye image incident thereon;
a receiver which receives an external synchronization signal which is synchronized with an external display of the left eye image and the right eye image; and
a control unit which generates an internal synchronization signal based on a periodic portion of the external synchronization signal, and generates an output signal based on the internal synchronization signal,
wherein if the external synchronization signal comprises a signal which periodically alternates between a first level and a second level, the output signal corresponds to the external synchronization signal; and if the external synchronization signal comprises a signal which does not periodically alternate between the first level and the second level due to having been interrupted, the output signal corresponds to the internal synchronization signal.

24. A shutter glass apparatus comprising:
a left eye unit operable to receive and transmit a left eye image;
a right eye unit operable to receive and transmit a right eye image;
a receiver which receives an external synchronization signal which is synchronized with an external 3D display of the left eye image and the right eye image; and a control unit which generates an internal synchronization signal based on the external synchronization signal, and generates an output signal for driving the left eye unit and the right eye unit based on the external synchronization signal and the internal synchronization signal;

wherein the control unit determines a periodic characteristic of the internal synchronization signal by using a periodic characteristic of the external synchronization signal, and if the receiving of the external synchronization signal by the receiver is interrupted, the control unit maintains the periodic characteristic of the internal synchronization signal by using the determined periodic characteristic of the internal synchronization signal, wherein the control unit generates the internal synchronization signal based on a periodic portion of the external synchronization signal, and wherein if the external synchronization signal comprises a signal which periodically alternates between a first level and a second level, the output signal corresponds to the external synchronization signal; and if the external synchronization signal comprises a signal which does not periodically alternate between the first level and the second level due to having been interrupted, the output signal corresponds to the internal synchronization signal.

25. The apparatus of claim 24, wherein if the receiving of the external synchronization signal by the receiver is not interrupted, the control unit repeatedly determines the periodic characteristic of the internal synchronization signal by referring to several cycles of the external synchronization signal.

26. The apparatus of claim 24, wherein the internal synchronization signal is a sequence of pulses for driving the left eye unit and the right eye unit.

27. The apparatus of claim 24, wherein if the external synchronization signal has an unexpected signal characteristic, the control unit determines that the receiving of the external synchronization signal by the receiver is interrupted.

28. The apparatus of claim 24, wherein if the external synchronization signal is low at a time when an expected value of the external synchronization signal is high, the control unit determines that the receiving of the external synchronization signal by the receiver is interrupted.

29. The apparatus of claim 24, wherein if the receiving of the external synchronization signal by the receiver is not interrupted, the control unit generates the internal synchronization signal according to a shape of pulses of the external synchronization signal.

30. An image system, comprising:
a display device which transmits a display synchronization signal which is synchronized with an alternating display of a left eye image and a right eye image; and
a shutter glasses, wherein the shutter glasses comprise:
 a left eye unit operable to receive and transmit the left eye image,
 a right eye unit operable to receive and transmit the right eye image,
 a receiver which receives the display synchronization signal, and
 a control unit which generates a reference synchronization signal based on the display synchronization signal, and generates an output signal, for driving the left eye unit and the right eye unit, based on the display synchronization signal and the reference synchronization signal,
 wherein the control unit determines a periodic characteristic of the reference synchronization signal by using a periodic characteristic of the display synchronization signal, and if the receiving of the display synchronization signal in the receiver is interrupted, the control unit maintains the periodic characteristic of the reference synchronization signal by using the determined periodic characteristic,
 wherein the control unit generates the reference synchronization signal using a periodic portion of the display synchronization signal, and
 wherein if the external synchronization signal comprises a signal which periodically alternates between a first level and a second level, the output signal corresponds to the external synchronization signal; and if the external synchronization signal comprises a signal which does not periodically alternate between the first level and the second level due to having been interrupted, the output signal corresponds to the internal synchronization signal.

31. The image systems of claim 30, wherein if the receiving of the display synchronization signal by the receiver is not interrupted, the control unit repeatedly determines the periodic characteristic of the reference synchronization signal based on several cycles of the display synchronization signal.

32. The image systems of claim 30, wherein the reference synchronization signal is a sequence of pulses for driving the left eye unit and the right eye unit.

33. The image systems of claim 30, wherein if the display synchronization signal has an unexpected signal characteristic, the control unit determines that the receiving of the display synchronization signal by the receiver is interrupted.

34. The image systems of claim 30, wherein if the display synchronization signal is low at a time when an expected value of the display synchronization signal is high, the control unit determines that the receiving of the display synchronization signal by the receiver is interrupted.

35. The image systems of claim 30, wherein if the receiving of the display synchronization signal by the receiver is not interrupted, the control unit generates the reference synchronization signal according to a shape of pulses of the display synchronization signal.

36. A shutter glass apparatus comprising:
a left eye shutter operable to receive and transmit a left eye image;
a right eye shutter operable to receive and transmit a right eye image;
a receiver which receives an external synchronization signal synchronized with an external 3D display image of the left eye image and the right eye image; and
a control unit which generates an output signal for alternately driving the left eye shutter and the right eye shutter, and determines on/off time information of the left eye shutter and the right eye shutter,
wherein if the external synchronization signal comprises a signal which periodically alternates between a first level and a second level, the control unit determines that the external synchronization signal is not interrupted, and generates the output signal based on the external synchronization signal, and
wherein if the external synchronization signal which does not periodically alternate between the first level and the second level, the control unit determines that the external synchronization signal is interrupted, and maintains the output signal based on the determined on/off time information,
wherein the control unit generates the output signal using a periodic portion of the external synchronization signal wherein the external synchronization signal as a whole is non-periodic due to having been interrupted.

37. The apparatus of claim 36, the control unit repeatedly determines the on/off time information by referring to periodic portions of the external synchronization signal.

38. The apparatus of claim 36, wherein the output signal is a sequence of pulses for driving the left eye shutter and the right eye shutter.

39. The apparatus of claim 36, wherein if the external synchronization signal has an unexpected signal characteristic, the control unit determines that the receiving of the external synchronization signal by the receiver is interrupted.

40. The apparatus of claim 36, wherein the control unit determines the on/off time information according to a periodic characteristic of the external synchronization signal.

* * * * *